US008092176B2

(12) United States Patent
Liang

(10) Patent No.: US 8,092,176 B2
(45) Date of Patent: Jan. 10, 2012

(54) TURBINE AIRFOIL COOLING SYSTEM WITH CURVED DIFFUSION FILM COOLING HOLE

(75) Inventor: George Liang, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 598 days.

(21) Appl. No.: 12/338,201

(22) Filed: Dec. 18, 2008

(65) Prior Publication Data

US 2010/0068033 A1 Mar. 18, 2010

Related U.S. Application Data

(60) Provisional application No. 61/097,326, filed on Sep. 16, 2008.

(51) Int. Cl.

| | |
|---|---|
| ***B63H 1/14*** | (2006.01) |
| ***B63H 7/02*** | (2006.01) |
| ***B63H 1/28*** | (2006.01) |
| ***B64C 11/00*** | (2006.01) |
| ***B64C 11/16*** | (2006.01) |
| ***F01D 5/08*** | (2006.01) |
| ***F01D 5/18*** | (2006.01) |
| ***F01D 5/20*** | (2006.01) |
| ***F01D 5/14*** | (2006.01) |
| ***F04D 29/58*** | (2006.01) |
| ***F03D 11/02*** | (2006.01) |

(52) U.S. Cl. ................. 416/96 R; 416/97 R; 416/231 R

(58) Field of Classification Search ................ 416/96 R, 416/97 R, 231 R
See application file for complete search history.

(56) References Cited

U.S. PATENT DOCUMENTS

| | | | | |
|---|---|---|---|---|
| 4,653,983 | A | 3/1987 | Vehr | |
| 4,684,323 | A | 8/1987 | Field | |
| 5,382,133 | A | 1/1995 | Moore et al. | |
| 5,403,158 | A * | 4/1995 | Auxier | 416/97 R |
| 6,164,912 | A * | 12/2000 | Tabbita et al. | 416/97 R |
| 6,183,199 | B1 | 2/2001 | Beeck et al. | |
| 6,869,268 | B2 | 3/2005 | Liang | |
| 6,918,742 | B2 | 7/2005 | Liang | |
| 7,303,375 | B2 * | 12/2007 | Cunha et al. | 416/90 R |
| 7,374,401 | B2 * | 5/2008 | Lee | 416/97 R |
| 7,854,591 | B2 * | 12/2010 | Liang | 416/97 R |
| 7,922,451 | B1 * | 4/2011 | Liang | 416/97 R |
| 7,985,050 | B1 * | 7/2011 | Liang | 416/97 R |

* cited by examiner

*Primary Examiner* — David Zarneke

(57) ABSTRACT

A cooling system for a turbine airfoil of a turbine engine having at least one diffusion film cooling hole positioned in an outer wall defining the turbine airfoil is disclosed. The diffusion film cooling hole includes a first sidewall having a first radius of curvature about an axis generally orthogonal to a centerline of cooling fluid flow through the diffusion film cooling hole and a second sidewall having a second radius of curvature about an axis generally orthogonal to the centerline of cooling fluid flow through the at least one diffusion film cooling hole. The radii of curvature of the first and second sidewalls are different such that the diffusion film cooling hole includes an ever increasing cross-sectional area moving from an inlet to an outlet, thereby diffusing and reducing the velocity of cooling fluids flowing there through.

20 Claims, 2 Drawing Sheets

TURBINE AIRFOIL COOLING SYSTEM WITH CURVED DIFFUSION FILM COOLING HOLE

CROSS-REFERENCE TO RELATED APPLICATION

This patent application claims the benefit of U.S. Provisional Patent Application No. 61/097,326, filed Sep. 16, 2008, which is incorporated by reference in its entirety.

FIELD OF THE INVENTION

This invention is directed generally to turbine airfoils, and more particularly to cooling systems in hollow turbine airfoils.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies and turbine vanes to these high temperatures. As a result, turbine airfoils must be made of materials capable of withstanding such high temperatures. In addition, turbine airfoils often contain cooling systems for prolonging the life of the turbine airfoils and reducing the likelihood of failure as a result of excessive temperatures.

Typically, turbine airfoils contain an intricate maze of cooling channels forming a cooling system. Turbine airfoils include turbine blades and turbine vanes. Turbine blades are formed from a root portion having a platform at one end and an elongated portion forming a blade that extends outwardly from the platform coupled to the root portion. The blade is ordinarily composed of a tip opposite the root section, a leading edge, and a trailing edge. Turbine vanes have a similar configuration except that a radially outer and is attached to a shroud and a radially inner end meshes with a rotatable rotor assembly. The cooling channels in a turbine airfoil receive air from the compressor of the turbine engine and pass the air through the airfoil. The cooling channels often include multiple flow paths that are designed to maintain all aspects of the turbine airfoil at a relatively uniform temperature. However, centrifugal forces and air flow at boundary layers often prevent some areas of the turbine airfoil from being adequately cooled, which results in the formation of localized hot spots. Localized hot spots, depending on their location, can reduce the useful life of a turbine airfoil and can damage a turbine blade to an extent necessitating replacement of the airfoil.

In one conventional cooling system, diffusion orifices have been used in outer walls of turbine airfoils. Typically, the diffusion orifices are aligned with a metering orifices that extends through the outer wall to provide sufficient cooling to turbine airfoils. The objective of the diffusion orifices is to reduce the velocity of the cooling fluids to create an effective film cooling layer. Nonetheless, many conventional diffusion orifices are configured such that cooling fluids are exhausted and mix with the hot gas path and become ineffective.

SUMMARY OF THE INVENTION

This invention relates to a turbine airfoil cooling system for a turbine airfoil used in turbine engines. In particular, the turbine airfoil cooling system is directed to a cooling system having an internal cavity positioned between outer walls forming a housing of the turbine airfoil. The cooling system may include a diffusion film cooling hole in the outer wall that may be adapted to receive cooling fluids from the internal cavity, meter the flow of cooling fluids through the diffusion film cooling hole, and release the cooling fluids into a film cooling layer proximate to an outer surface of the airfoil. The diffusion film cooling hole may be curved and include an ever increasing cross-sectional area across that allow cooling fluids to diffuse to create better film coverage and yield better cooling of the turbine airfoil.

The turbine airfoil may be formed from a generally elongated airfoil having a leading edge, a trailing edge and at least one cavity forming a cooling system in the airfoil. An outer wall forming the generally elongated airfoil may have at least one diffusion film cooling hole positioned in the outer wall and providing a cooling fluid pathway between the at least one cavity forming the cooling system and an environment outside of the airfoil. The diffusion film cooling hole may include a first sidewall having a first radius of curvature about an axis generally orthogonal to a centerline of cooling fluid flow through the diffusion film cooling hole and may include a second sidewall having a second radius of curvature about an axis generally orthogonal to the centerline of cooling fluid flow through the at least one diffusion film cooling hole. The radii of curvature of the first and second sidewalls may be different, and the radius of curvature of the first sidewall may be less than the radius of curvature of the second sidewall, which is downstream from the first sidewall.

The diffusion film cooling hole may be positioned in an outer wall and extend from an inlet on an inner surface of the outer wall to an outlet on an outer surface of the outer wall. The inlet of the diffusion film cooling hole may be generally circular. The diffusion film cooling hole may have an ever increasing cross-sectional area extending from the inlet to an outlet at an outer surface of the outer wall. The outlet may have a racetrack configuration in the outer surface. The racetrack configuration may be formed from semicircular ends coupled together with linear sides. The sidewalls of the at least one diffusion film cooling hole may extend between the semicircular ends and each may extend from an inlet to an outlet within single planes.

The radii of curvature of the semicircular ends may be equal in size. The airfoil may include a plurality of diffusion film cooling holes. The diffusion film cooling holes may be positioned in the leading edge to form a showerhead. The diffusion film cooling holes may be offset such that the centerline of flow of an inlet of one diffusion film cooling hole is offset from being aligned with the centerline of flow of an outlet of the other diffusion film cooling hole.

During operation, cooling fluids, such as gases, are passed through the cooling system. In particular, cooling fluids may pass into the internal cavity, enter the inlet, pass through the curved diffusion film cooling hole, and exit the diffusion film cooling hole through the outlet. The inlet may operate to meter the flow of cooling fluids through the diffusion film cooling hole. Downstream of the inlet, the remaining portions of the diffusion film cooling hole may enable the cooling fluids to undergo multiple expansion such that more efficient use of the cooling fluids may be used during film cooling applications. Little or no expansion occurs at the first sidewall, which is the upstream side, of the diffusion film cooling hole. This configuration with the different radii for the first and second sidewalls enables an even larger outlet of the diffusion film cooling hole, which translates into better film coverage and yields better film cooling. The curved first and second sidewalls create a smooth diffusion section that allows film cooling flow to spread out of the diffusion film cooling hole at the outlet better than conventional configurations. Additionally, the diffusion film cooling hole minimizes film layer shear mixing with the hot gas flow and thus, yields a higher level of cooling fluid effectiveness.

An advantage of the diffusion film cooling hole is that the divergent cooling hole includes curved divergent side walls configured to create efficient use of cooling fluids in forming film cooling flows.

Another advantage of the diffusion film cooling hole is that the diffusion film cooling hole includes an elongated configuration that may be positioned in the leading edge and form a showerhead with reduced exit velocity that lowers the film blowing parameter ratio, which equates to a better film effectiveness for the airfoil leading edge showerhead.

Yet another advantage of the diffusion film cooling hole is a larger outlet at the outer surface of the outer wall is created by the first and second sidewalls having different radii of curvature, which increases the size of the opening and forms a racetrack shaped opening that enables cooling fluids to spread out in multiple directions.

Another advantage of the diffusion film cooling hole eliminates the cooling hole overlap problem of conventional configurations at the inner surface of the airfoil leading edge, which facilitates a reduction in over cooling of the airfoil at the inner surface of the leading edge and reduces the cooling air heat up, which yields a higher overall potential for the internal film cooling hole.

Still another advantage of the diffusion film cooling hole is that the diffusion film cooling hole have reduced stress concentrations where the surfaces of the third section intersect with the outer surface of the outer wall because of the elimination of sharp corners at the intersection.

Yet another advantage of the diffusion film cooling hole is that the configuration of the diffusion film cooling hole does not include a sharp corner within the hole, thereby preventing flow separation.

Another advantage of the diffusion film cooling hole is that the diffusion film cooling hole exhausts cooling fluids at a lower angle than conventional configurations, thereby forming a better film layer and higher film effectiveness.

Still another advantage of the diffusion film cooling hole is that the diffusion hole also achieves more convection area at the external half of the airfoil wall.

Another advantage of the diffusion film cooling hole is that more convective cooling occurs at the external half of the airfoil than at the inner half of the airfoil, thereby achieving a more balanced thermal design for the leading edge.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
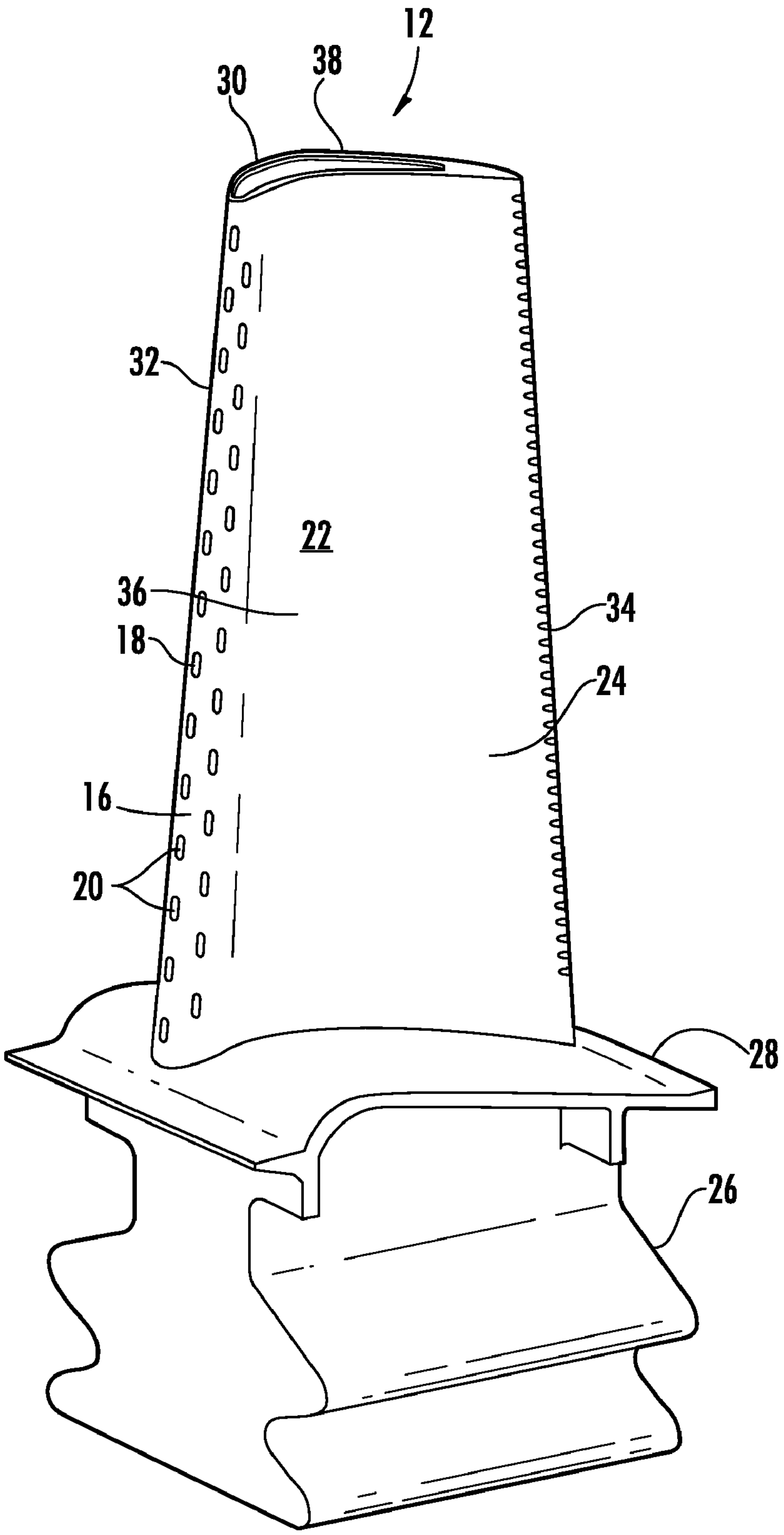
FIG. 1 is a perspective view of a turbine airfoil having features according to the instant invention.
Figure 2:
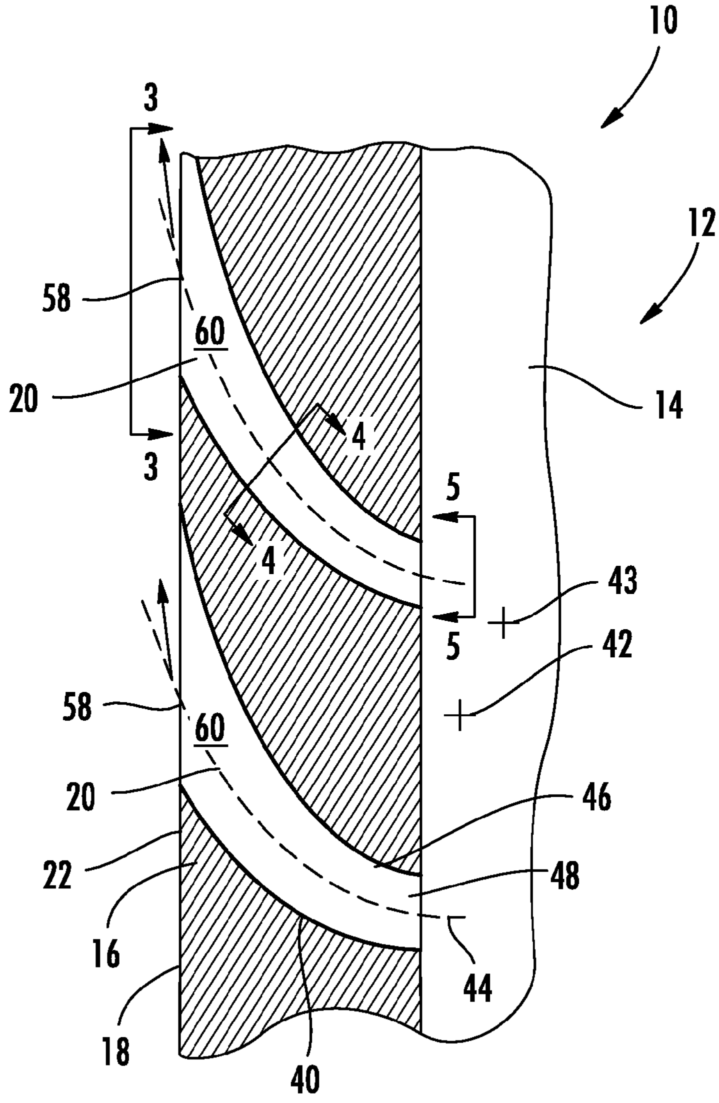
FIG. 2 is cross-sectional, detailed view, referred to as a filleted view, of a diffusion film cooling hole of the turbine airfoil shown in FIG. 1 taken along section line 2-2.

As shown in FIGS. 1-5, this invention is directed to a turbine airfoil cooling system 10 for a turbine airfoil 12 used in turbine engines. In particular, the turbine airfoil cooling system 10 is directed to a cooling system 10 having an internal cavity 14, as shown in FIG. 2, positioned between outer walls 16 forming a housing 18 of the turbine airfoil 12. The cooling system 10 may include a diffusion film cooling hole 20 in the outer wall 16 that may be adapted to receive cooling fluids from the internal cavity 14, meter the flow of cooling fluids through the diffusion film cooling hole 20, and release the cooling fluids into a film cooling layer proximate to an outer surface 22 of the airfoil 12. The diffusion film cooling hole 20 may be curved and include an ever increasing cross-sectional area across that allow cooling fluids to diffuse to create better film coverage and yield better cooling of the turbine airfoil.

The turbine airfoil 12 may be formed from a generally elongated airfoil 24. The turbine airfoil 12 may be a turbine blade, a turbine vane or other appropriate structure. In embodiments in which the turbine airfoil 12 is a turbine blade, the airfoil 24 may be coupled to a root 26 at a platform 28. The turbine airfoil 12 may be formed from other appropriate configurations and may be formed from conventional metals or other acceptable materials. The generally elongated airfoil 24 may extend from the root 26 to a tip 30 and include a leading edge 32 and trailing edge 34. Airfoil 24 may have an outer wall 16 adapted for use, for example, in a first stage of an axial flow turbine engine. Outer wall 16 may form a generally concave shaped portion forming a pressure side 36 and may form a generally convex shaped portion forming a suction side 38. The cavity 14, as shown in FIG. 2, may be positioned in inner aspects of the airfoil 24 for directing one or more gases, which may include air received from a compressor (not shown), through the airfoil 24 and out one or more holes 20, such as in the leading edge 32, in the airfoil 24 to reduce the temperature of the airfoil 24 and provide film cooling to the outer wall 16. As shown in FIG. 1, the orifices 20 may be positioned in a leading edge 32, a tip 30, or outer wall 16, or any combination thereof, and have various configurations. The cavity 14 may be arranged in various configurations and is not limited to a particular flow path.

The cooling system 10 may include one or more diffusion film cooling holes 20 positioned in the outer wall 16 to provide a cooling fluid pathway between the internal cavity 14 forming the cooling system 10 and an environment outside of the airfoil 12. As shown in FIG. 2, the diffusion film cooling hole 20 may include a first sidewall 40 having a first radius of curvature about an axis 42 generally orthogonal to a centerline 44 of cooling fluid flow through the diffusion film cooling hole 20. The diffusion film cooling hole 20 may also include a second sidewall 46 having a second radius of curvature about an axis 43 generally orthogonal to the centerline 44 of cooling fluid flow through the diffusion film cooling hole 20. The radii of curvature of the first and second sidewalls 40, 46 may be different such that the diffusion film cooling hole 20 has an ever increasing cross-sectional area that enables the cooling fluids to diffuse and undergo velocity reduction. In at least one embodiment, the radius of curvature of the first sidewall 40 may be less than the radius of curvature of the second sidewall 46, which is downstream from the first sidewall 40.

Figure 3:
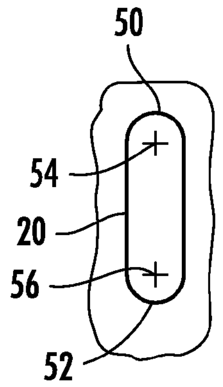
FIG. 3 is a detailed view of the outlet of the diffusion film cooling hole at detail 3-3.
Figure 4:
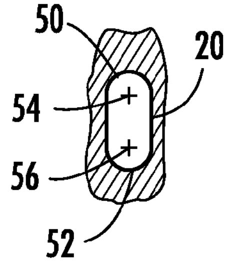
FIG. 4 is a cross-sectional view taken along line section line 4-4.
Figure 5:
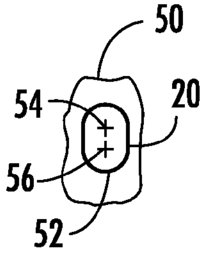
FIG. 5 is a detailed view of the inlet of the diffusion film cooling hole taken at line 5-5.

As shown in FIG. 2, the centerline 44 of the inlet 48 may be positioned orthogonal to the inner surface 60 of the outer wall 16. As shown in FIG. 5, the inlet 48 of the diffusion film cooling hole 20 may be generally circular. The inlet 48 may be formed from two opposing semicircular ends 50, 52 with centers 54, 56 positioned very close to each other. As shown in FIGS. 3 and 4, the centers 54, 56 may be separated from each other an increasing distance moving from the inlet 48 to the outlet 58. As shown in FIG. 3, the diffusion film cooling hole 20 may be a racetrack configuration in the outer surface 22. As shown in FIGS. 3-5, the semicircular ends 50, 52 may be coupled together with sides, which in at least one embodiment may be linear, and each side may reside in a single plane. In particular, the sidewalls 40, 46 of the diffusion film cooling hole 20 may extend between the semicircular ends and may each extend from the inlet 48 to the outlet 58 within single planes. The radii of curvature of the semicircular ends 50, 52 may be generally equal in size, or have another appropriate configuration.

As shown in FIG. 2, the airfoil 12 may include a plurality of diffusion film cooling holes 20. The diffusion film cooling holes 20 may be offset such that the centerline 44 of flow of an inlet 48 of one diffusion film cooling hole 20 is offset from being aligned with the centerline 48 of flow of an outlet 58 of an adjacent diffusion film cooling hole 20. Such a configuration minimizes overcooling of the inner surface 60 of the outer wall 16 and reduces the cooling fluid heat up, which yields a higher overall internal film cooling hole cooling potential. As shown in FIG. 1, the diffusion film cooling hole 20 may be positioned in the leading edge 32 of the airfoil 12 to form a showerhead to create film cooling at the showerhead.

During operation, cooling fluids, such as gases, are passed through the cooling system 10. In particular, cooling fluids may pass into the internal cavity 14, enter the inlet 48, pass through the curved diffusion film cooling hole 20, and exit the diffusion film cooling hole 20 through the outlet 58. The inlet 48 may operate to meter the flow of cooling fluids through the diffusion film cooling hole 20. Downstream of the inlet 48, the remaining portions of the diffusion film cooling hole 20 may enable the cooling fluids to undergo multiple expansion such that more efficient use of the cooling fluids may be used during film cooling applications. Little or no expansion occurs at the first sidewall 40, which is the upstream side, of the diffusion film cooling hole 20. This configuration with the different radii for the first and second sidewalls 40, 46 enables an even larger outlet 58 of the diffusion film cooling hole 20, which translates into better film coverage and yields better film cooling. The curved first and second sidewalls 40, 46 create a smooth diffusion section that allows film cooling flow to spread out of the diffusion film cooling hole 20 at the outlet 58 better than conventional configurations. Additionally, the diffusion film cooling hole 20 minimizes film layer shear mixing with the hot gas flow and thus, yields a higher level of cooling fluid effectiveness.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A turbine airfoil, comprising:

a generally elongated airfoil having a leading edge, a trailing edge and at least one cavity forming a cooling system in the airfoil;

an outer wall forming the generally elongated airfoil and having at least one diffusion film cooling hole positioned in the outer wall and providing a cooling fluid pathway between the at least one cavity forming the cooling system and an environment outside of the airfoil;

wherein the at least one diffusion film cooling hole includes a first sidewall having a first radius of curvature about an axis generally orthogonal to a centerline of cooling fluid flow through the at least one diffusion film cooling hole and a second sidewall having a second radius of curvature about an axis generally orthogonal to the centerline of cooling fluid flow through the at least one diffusion film cooling hole; and wherein the radii of curvature of the first and second sidewalls are different and wherein the radius of curvature of the first sidewall is less than the radius of curvature of the second sidewall, which is downstream from the first sidewall.

2. The turbine airfoil of claim 1, wherein an inlet to the at least one diffusion film cooling hole is circular.

3. The turbine airfoil of claim 1, wherein the at least one diffusion film cooling hole has an ever increasing cross-sectional area extending from the inlet to an outlet at an outer surface of the outer wall.

4. The turbine airfoil of claim 3, wherein the outlet has a racetrack configuration in the outer surface.

5. The turbine airfoil of claim 3, wherein the racetrack configuration is formed from semicircular ends coupled with linear sides.

6. The turbine airfoil of claim 5, wherein radii of curvature of the semicircular ends are equal in size.

7. The turbine airfoil of claim 1, wherein the at least one diffusion film cooling hole comprises a plurality of diffusion film cooling holes, wherein the diffusion film cooling holes are offset such that the centerline of flow of an inlet of one diffusion film cooling hole is offset from being aligned with the centerline of flow of an outlet of the other diffusion film cooling hole.

8. The turbine airfoil of claim 1, wherein the sidewalls of the at least one diffusion film cooling hole extending between the semicircular ends each extend from an inlet to an outlet within single planes.

9. The turbine airfoil of claim 1, wherein the at least one diffusion film cooling hole is positioned in the leading edge of the airfoil.

10. A turbine airfoil, comprising:

a generally elongated airfoil having a leading edge, a trailing edge and at least one cavity forming a cooling system in the airfoil;

an outer wall forming the generally elongated airfoil and having at least one diffusion film cooling hole positioned in the outer wall and providing a cooling fluid pathway between the at least one cavity forming the cooling system and an environment outside of the airfoil;

wherein the at least one diffusion film cooling hole includes a first sidewall having a first radius of curvature about an axis generally orthogonal to a centerline of cooling fluid flow through the at least one diffusion film cooling hole and a second sidewall having a second radius of curvature about an axis generally orthogonal to the centerline of cooling fluid flow through the at least one diffusion film cooling hole;

wherein the radii of curvature of the first and second sidewalls are different and wherein the radius of curvature of the first sidewall is less than the radius of curvature of the second sidewall, which is downstream from the first sidewall;

wherein an inlet of the at least one diffusion film cooling hole is generally circular and functions as a metering device by metering the flow of cooling fluids from the central cavity into the at least one diffusion film cooling hole; and wherein the at least one diffusion film cooling hole has an ever increasing cross-sectional area extending from the inlet to an outlet at an outer surface of the outer wall.

11. The turbine airfoil of claim 10, wherein the outlet has a racetrack configuration in the outer surface.

12. The turbine airfoil of claim 11, wherein the racetrack configuration is formed from semicircular ends coupled with linear sides.

13. The turbine airfoil of claim 12, wherein radii of curvature of the semicircular ends are equal in size.

14. The turbine airfoil of claim 10, wherein the at least one diffusion film cooling hole comprises a plurality of diffusion film cooling holes, wherein the diffusion film cooling holes are offset such that the centerline of flow of an inlet of one diffusion film cooling hole is offset from being aligned with the centerline of flow of an outlet of the other diffusion film cooling hole.

15. The turbine airfoil of claim 10, wherein the sidewalls of the at least one diffusion film cooling hole extending between the semicircular ends each extend from an inlet to an outlet within single planes.

16. The turbine airfoil of claim 10, wherein the at least one diffusion film cooling hole is positioned in the leading edge of the airfoil.

17. A turbine airfoil, comprising:

a generally elongated airfoil having a leading edge, a trailing edge and at least one cavity forming a cooling system in the airfoil;

an outer wall forming the generally elongated airfoil and having at least one diffusion film cooling hole positioned in the outer wall and providing a cooling fluid pathway between the at least one cavity forming the cooling system and an environment outside of the airfoil;

wherein the at least one diffusion film cooling hole includes a first sidewall having a first radius of curvature about an axis generally orthogonal to a centerline of cooling fluid flow through the at least one diffusion film cooling hole and a second sidewall having a second radius of curvature about an axis generally orthogonal to the centerline of cooling fluid flow through the at least one diffusion film cooling hole;

wherein the radii of curvature of the first and second sidewalls are different and wherein the radius of curvature of the first sidewall is less than the radius of curvature of the second sidewall, which is downstream from the first sidewall;

wherein an inlet of the at least one diffusion film cooling hole is generally circular and functions as a metering device by metering the flow of cooling fluids from the central cavity into the at least one diffusion film cooling hole;

wherein the at least one diffusion film cooling hole has an ever increasing cross-sectional area extending from the inlet to an outlet at an outer surface of the outer wall;

wherein radii of curvature of the semicircular ends are equal in size to a radius of curvature of the inlet; and wherein the sidewalls of the at least one diffusion film cooling hole extending between the semicircular ends each extend from an inlet to an outlet within single planes.

18. The turbine airfoil of claim 17, wherein the outlet has a racetrack configuration in the outer surface, wherein the racetrack configuration is formed from semicircular ends coupled with linear sides.

19. The turbine airfoil of claim 17, wherein the at least one diffusion film cooling hole comprises a plurality of diffusion film cooling holes, wherein the diffusion film cooling holes are offset such that the centerline of flow of an inlet of one diffusion film cooling hole is offset from being aligned with the centerline of flow of an outlet of the other diffusion film cooling hole.

20. The turbine airfoil of claim 17, wherein the at least one diffusion film cooling hole is positioned in the leading edge of the airfoil.

* * * * *